US008247771B2

(12) United States Patent
Ouvrier-Buffet (10) Patent No.: US 8,247,771 B2
(45) Date of Patent: Aug. 21, 2012

(54) DEVICE FOR DETECTION AND/OR EMISSION OF ELECTROMAGNETIC RADIATION AND METHOD FOR FABRICATING SUCH A DEVICE

(75) Inventor: Jean-Louis Ouvrier-Buffet, Sevrier (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 291 days.

(21) Appl. No.: 12/776,935

(22) Filed: May 10, 2010

(65) Prior Publication Data
US 2010/0314544 A1 Dec. 16, 2010

(30) Foreign Application Priority Data

Jun. 12, 2009 (FR) .................................... 09 02875

(51) Int. Cl.
*G01J 5/00* (2006.01)
*G01J 3/10* (2006.01)
*H01L 31/0203* (2006.01)
(52) U.S. Cl. .............. 250/338.1; 250/493.1; 250/504 R; 257/433; 438/55
(58) Field of Classification Search ............... 250/338.1, 250/338.4, 349, 352, 493.1, 504 R; 257/428, 257/433; 438/53, 54, 55, 57, 58, 471
See application file for complete search history.

(56) References Cited

U.S. PATENT DOCUMENTS

| 5,895,233 | A | 4/1999 | Higashi et al. |
| 5,921,461 | A | 7/1999 | Kennedy et al. |
| 6,753,526 | B2 | 6/2004 | Vilain |
| 7,279,682 | B2 | 10/2007 | Ouvrier-Buffet et al. |
| 2002/0175284 | A1 | 11/2002 | Vilain |
| 2004/0092041 | A1 | 5/2004 | Ouvrier-Buffet et al. |
| 2007/0278605 | A1* | 12/2007 | Shibayama ................... 257/432 |

FOREIGN PATENT DOCUMENTS

| EP | 1 243 903 A2 | 9/2002 |
| FR | 2 816 447 A1 | 5/2002 |
| JP | A-11-326037 | 11/1999 |
| JP | A-2000-337959 | 12/2000 |

* cited by examiner

*Primary Examiner* — Mark R Gaworecki
(74) *Attorney, Agent, or Firm* — Oliff & Berridge, PLC (57) ABSTRACT

The device for detection and/or emission of radiation has an encapsulation micropackage in a vacuum or under reduced pressure that comprises a cap and a substrate delineating a sealed housing. The housing encapsulates at least one uncooled thermal detector and/or emitter having a membrane sensitive to electromagnetic radiation suspended above the substrate, a reflector and at least one getter. The getter is arranged on at least a part of a second main surface of the reflector to form a reflector/getter assembly. A free space, releasing an accessible surface of the getter and in communication with the housing, is also formed between the reflector/getter assembly and the front surface of the substrate.

19 Claims, 10 Drawing Sheets

DEVICE FOR DETECTION AND/OR EMISSION OF ELECTROMAGNETIC RADIATION AND METHOD FOR FABRICATING SUCH A DEVICE

BACKGROUND OF THE INVENTION

The invention relates to a device for detection and/or emission of electromagnetic radiation having an encapsulation micropackage in a vacuum or under reduced pressure that comprises a cap and a substrate delineating a sealed housing. It comprises a uncooled thermal detector and/or emitter having a membrane sensitive to electromagnetic radiation suspended above the substrate. The housing encapsulates at least the uncooled thermal detector and/or emitter, a reflector for reflecting the electromagnetic radiation towards the membrane and at least one getter. The reflector is in the form of a thin layer arranged between a front surface of the substrate and the membrane, and has a first main surface facing the membrane and a second main surface facing the front surface of the substrate.

The invention also relates to a method for fabricating such a device.

STATE OF THE ART

Devices for detection and/or emission of electromagnetic radiation integrate one or more thermal detectors and/or emitters and use a change of thermal origin of the electrical properties of the materials constituting the detector and/or emitter such as the resistance or the dielectric constant. Thermal detectors and/or emitters are said to be "uncooled" when they operate without having recourse to cooling. Among these uncooled thermal detectors, infrared (IR) thermal detectors sensitive to infrared (IR) radiation in the III band (8 to 12 µm) are for example to be found.

Figure 1:
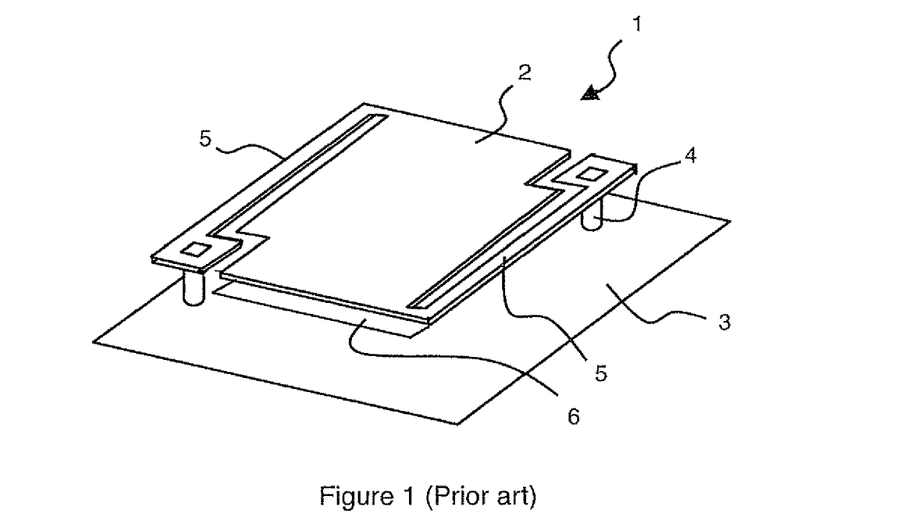
FIG. 1 schematically represents a cross-section of a uncooled thermal detector according to the prior art.

As represented in FIG. 1, uncooled thermal detectors and/or emitters 1 such as IR thermal detectors generally comprise a membrane 2 comprising the element sensitive to electromagnetic radiation thermally isolated from a substrate 3 by making isolating structures formed by microbridges 4 and heat-insulating arms 5. This suspended isolating structure tends to reduce the thermal inertia and therefore to reduce the response time of the signals emitted by the detector and/or emitter 1 and improve the signal-to-noise ratio. It is also known to arrange a reflector 6 in the form of a thin layer on substrate 3 facing membrane 2 in order to reflect the incident radiation to membrane 2 and optimize the efficiency of detector and/or emitter 1.

Figure 2:
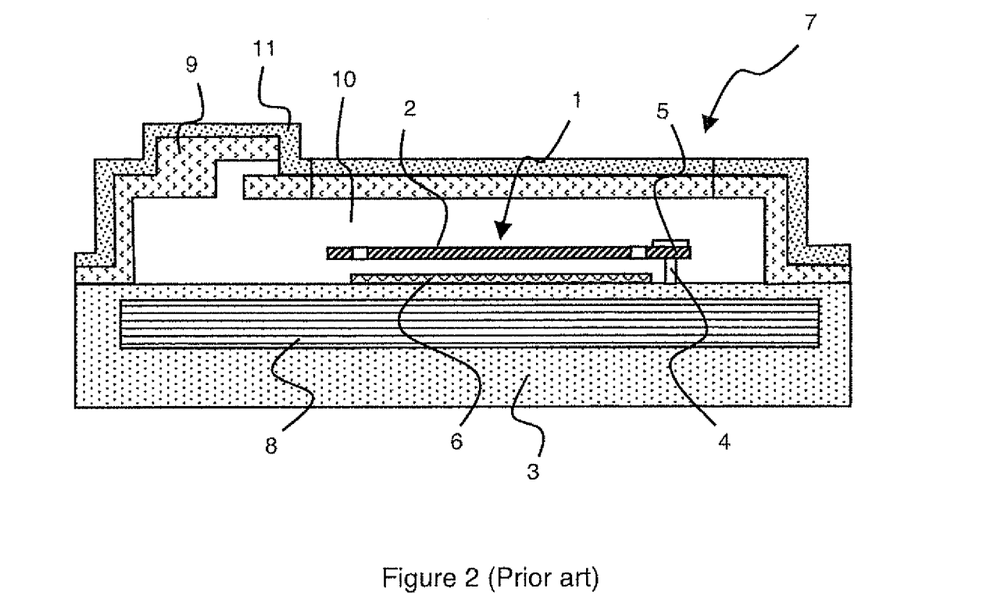
FIG. 2 schematically represents a cross-section of a device for detection and/or emission of electromagnetic radiation according to the prior art.

The device for detection and/or emission of electromagnetic radiation represented in FIG. 2 is conventionally formed by one or more uncooled thermal detectors and/or emitters 1 placed in a micropackage 7 and connected to a read circuit 8 arranged in substrate 3, the latter being conventionally made from silicon. The micropackage 7 is formed by a cap 9 and by substrate 3 that delineate a housing 10. Micropackage 7 is placed in a vacuum or under reduced pressure so as to limit heat losses and enhance performance. A sealing layer 11 covers cap 9 to make micropackage 7 hermetically tight. Cap 9 and sealing layer 11 are preferably formed by a material transparent to the radiations emitted or absorbed by the detectors and/or emitters 1 encapsulated in this way. They can also be provided with a window transparent to the radiations.

The performances of the device for detection and/or emission of electromagnetic radiation depend on integration of the detector and/or emitter in the device and on the quality of the thermal isolation.

Numerous works have been carried out to improve encapsulation of the detectors and/or emitters and in particular the quality of the vacuum in the detection and/or emission devices. Certain works propose using means for pumping residual gases within the device, the means being commonly called "getter". The function of the getter is to absorb or capture the residual gases released from the device during use of the latter after the micropackage has been sealed. The gaseous species that are liable to be given off from the inside walls of the device typically contain oxygen, hydrogen, nitrogen, carbon monoxide or dioxide, methane or other organic species. These residual gases are liable to cause an increase of the internal pressure in the micropackage and consequently to affect the quality of thermal isolation of the thermal detectors and/or emitters.

The getter is formed by one or more getter materials which, once activated, are reactive to certain of the residual gases. The getter materials have physical properties fostering absorption, diffusion and migration of the residual gases within the getter. Thus, placed in the micropackage of the device for detection and/or emission of electromagnetic radiation, the getter maintains the vacuum and pumps the residual gases.

For example purposes, the documents JP-A-11326037, U.S. Pat. No. 5,895,233, JP-A-2000337959 and U.S. Pat. No. 5,921,461 describe encapsulated IR detection devices containing a getter placed on areas situated on the inner surfaces of the sealed housing. These areas are unoccupied by the detectors and optically inactive. The document U.S. Pat. No. 5,895,233 in particular discloses getters arranged in an area of the substrate close to the detectors, on the walls of the microbridges or on the surface of the cap unoccupied by the window.

Furthermore, the chemical species used during the different manufacturing operations of such devices pollute the getters. Before the device is sealed, the getter has to be thermally activated, without however applying too high temperatures in order not to risk damaging the elements constituting the detector and/or emitter. This solution is often insufficient to obtain optimal properties of the getter.

In order to optimize the getter, the documents JP-A-2000337959 and U.S. Pat. No. 5,921,461 propose to confine the getter in compartments or to increase the volume or the surface of the getter. These solutions are however insufficient as they are implemented to the detriment of the number of detectors and/or emitters. The space set aside for the optically active elements in the micropackage is then greatly impinged on, thereby limiting the possibilities of miniaturization.

The document U.S. Pat. No. 7,279,682 proposes to implant the getter in a cavity placed outside the sealed housing and made on an inactive rear surface of the substrate. The rear surface used is opposite the active front surface that contains the read circuit. This cavity is in communication with the sealed housing via a tightly sealed passage passing through the thickness of the substrate. However, the substrate to be passed through being relatively thick, the sealed passage occupies a large space, about 10 µm, to the detriment of the space occupied by the detector. This arrangement constitutes a considerable impediment to individual encapsulation of detectors, in particular with small pitch (17 to 25 µm) and also to miniaturization of thermal detection devices.

The document U.S. Pat. No. 6,753,526 further describes an IR radiation detection device integrating a getter arranged on virtually the entire surface of the substrate, in particular under the membrane of the thermal IR detector. The authors suggest using a metallic getter presenting a high reflection coefficient to enable the latter to be used both as getter and as reflector, fulfilling both the absorbent and reflective functions.

OBJECT OF THE INVENTION

The object of the invention is to remedy the shortcomings of the prior art and in particular to improve the lifetime of the detectors without any adverse effect on the optical quality of the device.

It is a further object of the invention to provide a device meeting the miniaturization requirements of microcomponents while at the same time preserving optimal characteristics of the detection and/or emission device.

According to the invention, this object is achieved by a device for detection and/or emission of electromagnetic radiation and a method for fabricating such a device according to the appended claims.

In particular, this object is achieved by the fact that the getter is arranged on at least a part of the second main surface of the reflection means to form a reflector/getter assembly and by the fact that a free space, releasing a surface of the getter and in communication with the sealed housing, is formed between the reflector/getter assembly and the front surface of the substrate.

It is a further object of the invention to provide a method for fabricating a device for detection and/or emission of electromagnetic radiation that is simple to implement, inexpensive and compatible with conventional microelectronics techniques.

BRIEF DESCRIPTION OF THE DRAWINGS

Other advantages and features will become more clearly apparent from the following description of particular embodiments of the invention given for non-restrictive example purposes only and represented in the appended drawings, in which.

As is usual in representation of circuits, in particular integrated circuits, the various figures are not drawn to scale.

DESCRIPTION OF PARTICULAR EMBODIMENTS OF THE INVENTION

Figure 3:
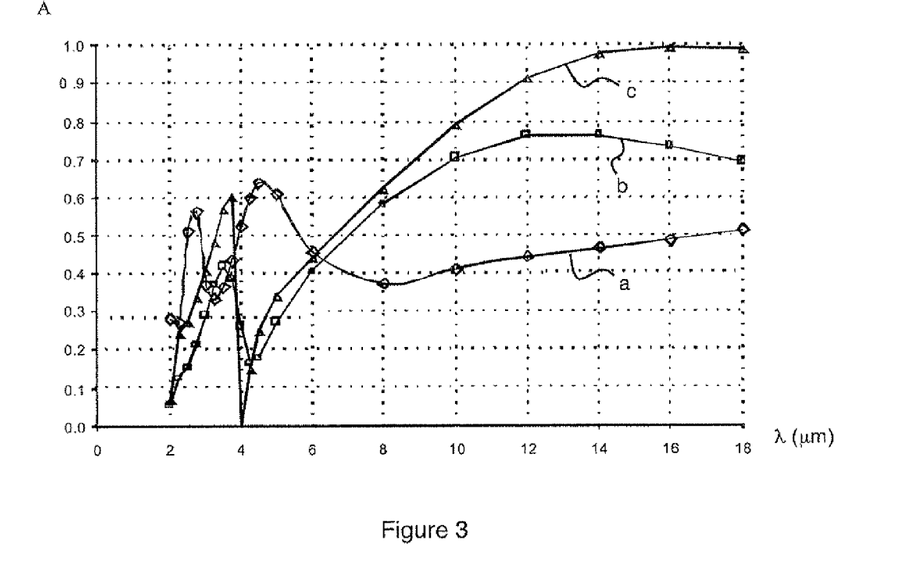
FIG. 3 corresponds to a graphic representation plotting the progression of the absorbed power over the incident power A of the radiation of different reflectors versus the radiation wavelength $\lambda$.

FIG. 3 highlights the shortcomings of use of a reflector at the same time serving the purpose of getter. The metallic thin layer constituting both the getter and the reflector in fact captures the gaseous species, in particular oxygen which is a highly oxidizing species. In use, this capture results in oxidation of the getter and causes an increase of the resistivity of the metallic layer and a deterioration of its ability to reflect incident radiation. The three plots a, b and c of FIG. 3 represent the ratio of the absorbed power over the incident power A versus the radiation wavelength $\lambda$ respectively of a resistive reflector, i.e. oxidized, of a bolometer comprising such a reflector and of a bolometer comprising a perfect reflector (not oxidized). These plots a, b and c show a degradation of the ratio of the absorbed power over the incident power for the bolometer comprising the resistive reflector.

Figure 4:
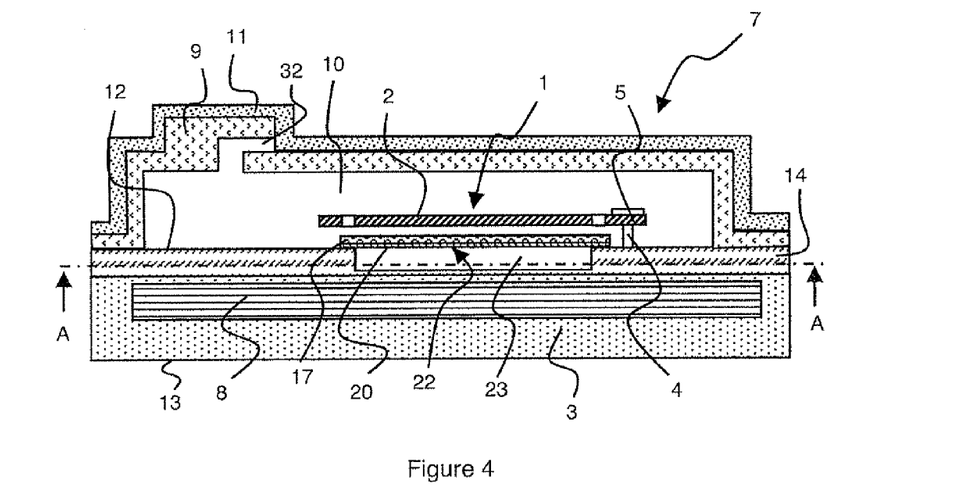
FIG. 4 schematically represents a cross-section of a first particular embodiment of a device for detection and/or emission of electromagnetic radiation according to the invention.

As illustrated in FIG. 4, a device for detection and/or emission of electromagnetic radiation comprises an encapsulation micropackage 7 in a vacuum or under reduced pressure, in known manner. This device is particularly suitable for uncooled thermal IR detectors such as microbolometers.

Micropackage 7 conventionally comprises a cap 9 and a substrate 3 delineating a tightly sealed housing 10. Housing 10 encapsulates at least a uncooled thermal detector and/or emitter 1 having a membrane 2 sensitive to electromagnetic radiation and suspended above substrate 3. Thermal detector and/or emitter 1 has to be encapsulated in a vacuum or under reduced pressure to achieve and maintain its performances in the course of use.

Housing 10 can encapsulate one or more thermal detectors and/or emitters 1, individually or in the form of an array, for example in the form of an array of four detectors 1. Housing 10 arranges a space above membrane 2 of thermal detector and/or emitter 1, separating the latter from cap 9, with a separating distance advantageously comprised between 0.5 μm and 5 μm.

Cap 9 is made from a material transparent to electromagnetic radiation or comprises a window transparent to electromagnetic radiation located in a plane parallel to membrane 2 and arranged facing membrane 2 to enable maximum absorption of the radiations. For example purposes, for detection or emission of infrared radiation, the transparent window can be made from silicon (Si), germanium (Ge) or zinc sulfide (ZnS).

Substrate 3 is typically in the form of a silicon wafer comprising a read circuit 8 and/or stimuli means, a front surface 12 called "active surface" and a rear surface 13 devoid of electronic components.

Front surface 12 of substrate 3 is advantageously formed by an electrically insulating superficial passivation layer 14. Superficial passivation layer 14 is typically a layer of silicon oxide (SiO) or silicon nitride (SiN) or silicon oxynitride ($SiO_xN_y$).

Front surface 12 of substrate 3 acts as support on which uncooled thermal detectors and/or emitters 1 bear or are anchored.

For an application in the infrared imagery field and in particular for monolithic infrared imagery systems operating at ambient temperature, the device can comprise a matrix architecture, i.e. contain several detectors 1, each detector also being able to be in the form of a matrix of elemental detectors. A silicon multiplexing circuit of CMOS or CDD type is also integrated in substrate 3 to serialize the electric signals coming from detectors 1 and to use the latter via a usual imagery system.

To limit thermal losses, detector and/or emitter 1 is constructed as a microstructure in thin layers with isolating arms 5 in accordance with a conventional suspended structure.

Membrane 2 is made in the form of one or more thin layers of heat-sensitive material with a thickness typically comprised between 0.1 µm and 1 µm and of an absorber that converts the electromagnetic radiation into heat and transmits it to the sensitive material.

Figure 5:
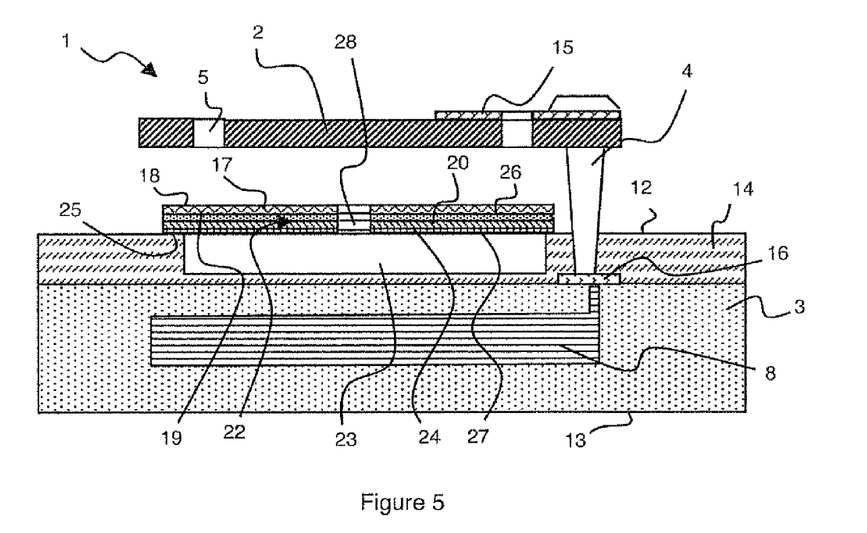
FIG. 5 schematically represents a cross-section of an enlargement of the device according to FIG. 4.

As represented in FIG. 5, electrodes 15 placed on membrane 2 with a conventional arrangement are electrically connected to read circuit 8 and/or to stimuli means by means of microbridges 4 and contacts 16 formed on substrate 3. Electrodes 15 and contacts 16 are made from metallic materials, for example from titanium (Ti), titanium nitride (TiN), platinum (Pt) or a nickel-chromium alloy (NiCr).

The device for detection and/or emission also comprises a reflector 17 in the form of a reflecting thin layer arranged between front surface 12 of substrate 3 and membrane 2. This thin layer is advantageously made from metal. Reflector 17 is arranged underneath membrane 2, parallel to the latter, and enables the electromagnetic radiation to be reflected towards membrane 2, thereby acting as reflecting means.

For a device comprising several detectors and/or emitters 1, the device comprises several individual reflectors 17. Each individual reflector 17 is advantageously arranged under membrane 2 of each detector and/or emitter 1.

Reflector 17 has a first main surface 18 facing membrane 2 and a second main surface 19 facing front surface 12 of substrate 3. An empty space separates reflector 17 from membrane 2 to release first main surface 18. Arranged in this way, first main surface 18 of reflector 17 can reflect the incident rays towards membrane 2 to enable the optical efficiency of thermal detector and/or emitter 1 to be optimized.

Reflector 17 is formed by one or more materials inert to the residual gases to be absorbed and presenting a high reflection coefficient, i.e. greater than or equal to 90%. Reflector 17 is preferably a good conductor of incident rays, dense and with a low porosity. A metal reflector 17 more particularly selected from aluminum, gold and copper or an alloy based on these metals, will preferably be chosen.

At least one getter 20 is arranged on at least a part of second main surface 19 of reflector 17 to form a reflector/getter assembly 22.

What is meant by "arranged on at least a part of second main surface 19" is the fact that the location of getter 20 is situated at the level of second main surface 19, underneath reflector 17. This means that getter 20 is securely attached to reflector 17 but not necessarily in direct contact with reflector 17. As represented in FIG. 5, it can thus be envisaged to interpose one or more thin layers 26 between reflector 17 and getter 20.

A free space 23, releasing an accessible surface 24 (bottom surface) of getter 20 and in communication with housing 10, is formed between reflector/getter assembly 22 and front surface 12 of substrate 3. What is meant by accessible surface 24 of getter 20 is the surface of getter 20 that is not turned towards reflector 17. This accessible surface 24 must be able to be or to become accessible to the residual gases.

Getter 20 is formed by one or more thin layers composed of at least one getter material reactive to the residual gases to be absorbed. The use of several getter materials enables pumping of the gases to advantageously be optimized by targeting the action of getter 20. The getter materials forming getter 20 are therefore chosen according to their physical properties, and in particular their ability to absorb a gas in particular and to make the latter diffuse and migrate within getter 20.

Getter 20 is preferably made from a metal chosen from titanium, molybdenum, barium, tantalum, zirconium, iron and vanadium or an alloy based on these metals.

To obtain a large as possible contact surface between getter 20 and the residual gases to be absorbed, getter 20 is preferably made in the form of a thin layer having a substantially identical geometry to that of reflector 17. It is located underneath reflector 17, parallel to the latter.

Reflector/getter assembly 22 forms a suspended structure above substrate 3 and that advantageously bears via at least one bearing point 25 on superficial passivation layer 14 forming front surface 12 of substrate 3. Getter 20 and reflector 17 are suspended and bear on the same substrate 3 preferably comprising read circuit 8 and/or stimuli means.

In FIG. 5, free space 23 constitutes a cavity in superficial passivation layer 14. Free space 23 is thereby delineated at its top part by reflector/getter assembly 22 and at its bottom part and laterally (from right to left in FIG. 5) by superficial passivation layer 14. Reflector/getter assembly 22 is advantageously situated in a plane parallel both to membrane 2 and to substrate 3.

Reflector/getter assembly 22 advantageously comprises a first barrier layer 26 between reflector 17 and getter 20. Accessible surface 24 of getter 20 can further comprise a second barrier layer 27 that is a provisional protective layer of getter 20. Second barrier layer 27 will become permeable for the residual gases to be absorbed to be able to access getter material 20 or will be eliminated before the device is sealed.

First and second barrier layers, respectively 26 and 27, are insulating layers and/or diffusion barrier layers that serve the purpose of protecting the elements constituting reflector 17 and getter 20. In particular, first barrier layer 26 is designed to preserve the chemical integrity of reflector 17 and of getter 20 by preventing in particular diffusion of chemical species from getter 20 to reflector 17 and any interdiffusion between the latter so as not to damage either of them. Second barrier layer 27 prevents any contamination of getter 20 by the various polluting gases occurring in the fabrication method of the device for detection and/or emission of electromagnetic radiation. First and second barrier layers, respectively 26 and 27, can be formed by one or more layers of silicon monoxide (SiO), silicon nitride (SiN or $Si_3N_4$) or titanium nitride (TiN), each layer having a thickness comprised between 0.05 µm and 2 µm.

For example purposes, layer 26 is made from silicon nitride and layer 27 is made preferably from a metallic material such as titanium nitride able to interact with the material of the getter.

The device for detection and/or emission comprises at least one hole 28 passing through reflector/getter assembly 22. Hole 28 opens out into cavity 23 under reflector/getter assembly 22 and enables housing 10 and cavity 23 to be made to communicate. The residual gases originating from housing 10 access cavity 23 and consequently accessible surface 24 of getter 20 via this hole 28.

Figure 6:
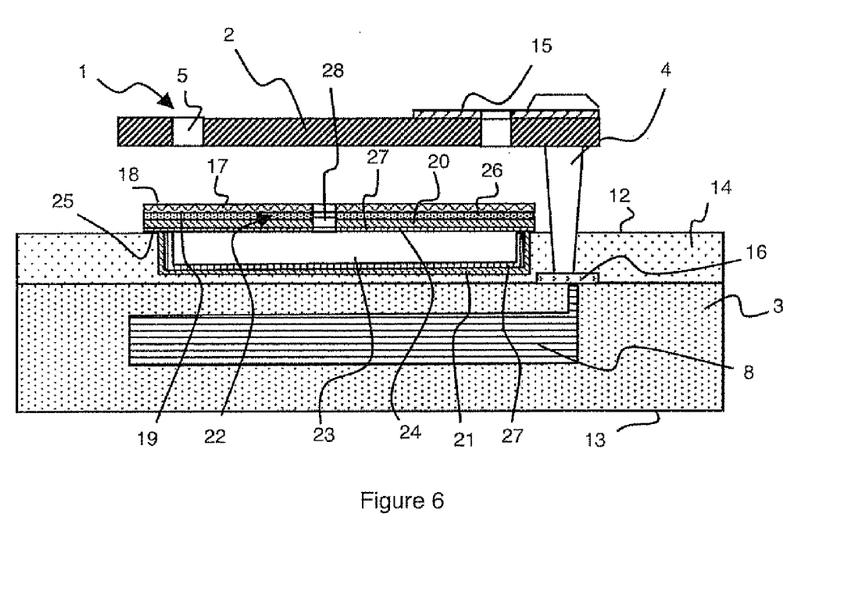
FIG. 6 schematically represents a cross-section of an enlargement of an alternative embodiment of the device according to FIG. 4.

According to an alternative embodiment represented in FIG. 6, the device for detection and/or emission of electromagnetic radiation can comprise not only a first getter 20 forming part of reflector/getter assembly 22, but also a second getter 21. This second getter can be identical to or different from first getter 20 and covers the bottom of cavity 23. The accessible surface of second getter 21 (top surface in FIG. 6) can also comprise a second barrier layer 27. As previously, barrier layer or barrier layers 27 are made permeable to make second getter 21 operational.

Figure 7:
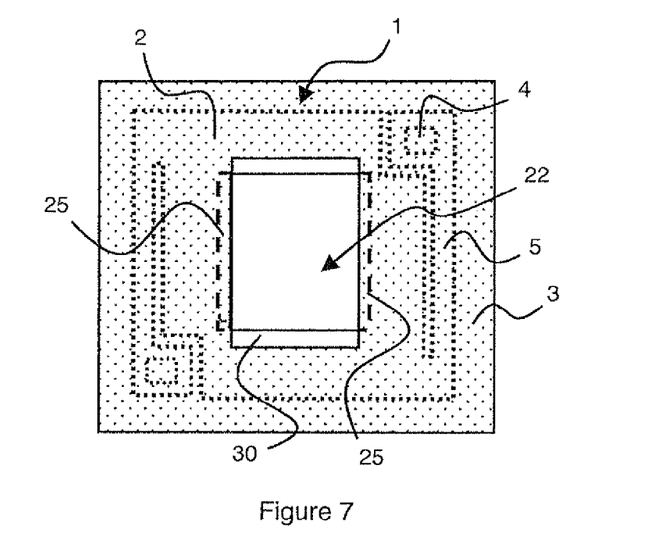
FIG. 7 schematically represents a cross-section of a view along the line AA of the device represented in FIG. 4.

According to another alternative embodiment represented in FIG. 7, reflector/getter assembly 22 does not have a hole 28. Cavity 23 is in communication with housing 10 by means of at least one lateral opening 30 of cavity 23. Cavity 23 being rectangular, and the width or length of reflector/getter assembly 22 being respectively smaller than the width or length of cavity 23, this lateral opening 30 corresponds to the space created by cavity 23 not covered by reflector/getter assembly 22.

A method for fabricating the device for detection and/or emission of electromagnetic radiation according to the first embodiment represented in FIG. 6 comprises formation of free space 23 between reflector/getter assembly 22 and front surface 12 of substrate 3. Free space 23 is produced by an etching step (FIG. 8) of superficial passivation layer 14 constituting front surface 12 of substrate 3. This formation step of free space 23 is integrated in a conventional encapsulation device fabrication method well known to the person skilled in the art and comprising usual microelectronics techniques, in particular the range of micromachining techniques such as deposition and etching of thin layers.

Figure 8:
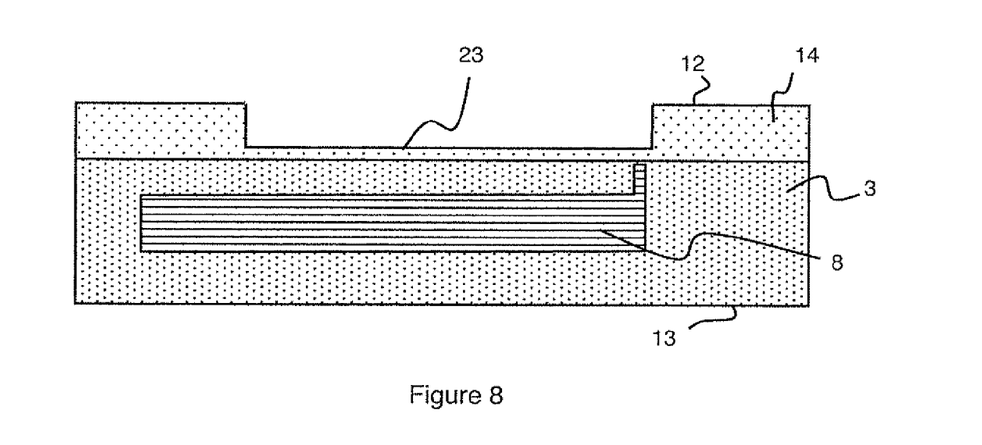
FIGS. 8 to 12 schematically represent cross-sections of different steps of a fabrication method of the invention according to FIG. 6.

The different characteristic steps involved in fabrication of the device according to FIG. 6 are represented in FIGS. 8 to 12. As represented in FIG. 8, we start out with a substrate 3 formed by a silicon wafer, for example with a thickness of 500 μm and a thin layer of SiO with a thickness comprised between 1 μm and 2 μm constituting superficial passivation layer 14. Substrate 3 can integrate the different components of an integrated circuit 8 and/or stimuli means. The passivation layer forming front surface 12 is etched without passing through the latter by means of any known method, conventionally by chemical or plasma etching, to form a cavity 23 having a depth advantageously comprised between 0.1 μm and 1 μm.

Figure 9:
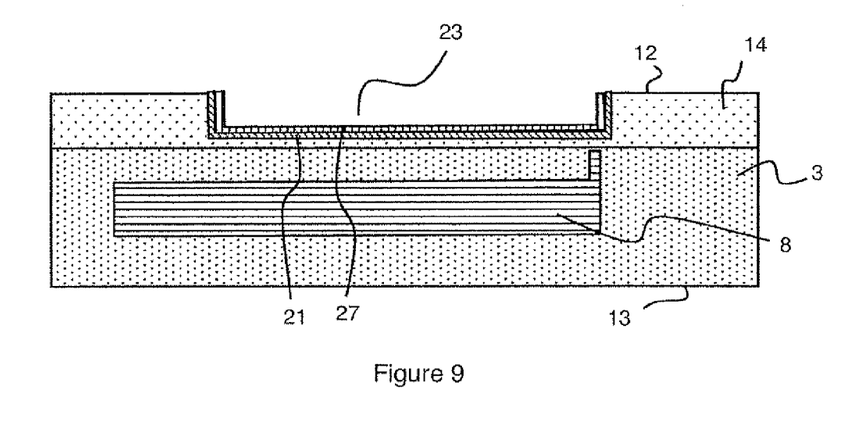
Figure 10:
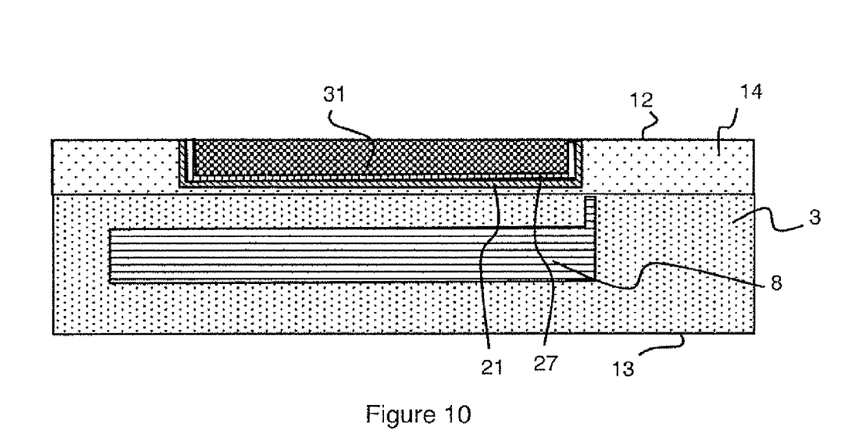

As represented in FIG. 9, a metallic thin layer forming second getter 21 is deposited, for example by cathode sputtering, chemical vapor deposition or evaporation on superficial passivation layer 14. Then the metallic thin layer is if required etched on front surface 12 of substrate 3 arranged at the periphery of cavity 23 (FIG. 9).

Second barrier layer 27 is then produced on second getter 21 by chemical vapor deposition, preferably LPCVD or PECVD, followed by possible etching of the barrier layer on front surface 12 of substrate 3 at the periphery of cavity 23. A thin layer of SiO, SiN or $Si_3N_4$ with a thickness comprised between 0.05 μm and 5 μm is for example obtained on second getter 21 (FIG. 9).

Cavity 23 thus formed is then filled with a sacrificial material, for example polyimide, then planarized with respect to the surface of superficial passivation layer 14, for example by chemical mechanical polishing (FIG. 10) to form a sacrificial layer 31.

Figure 11:
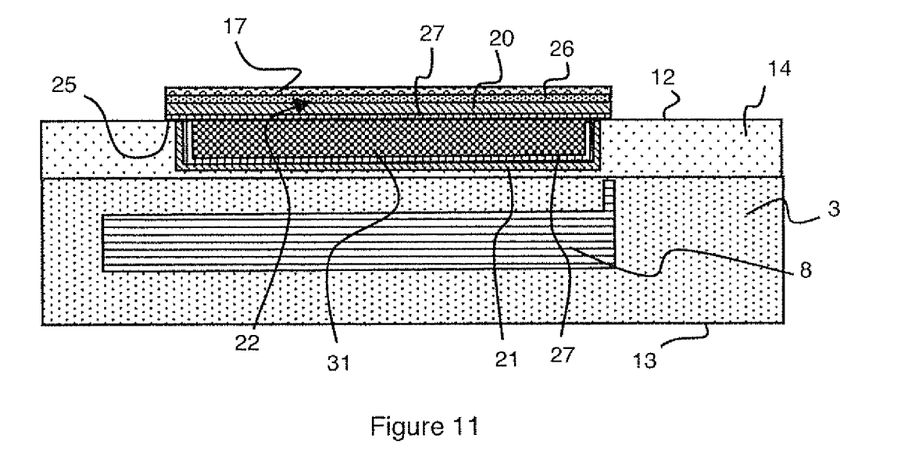

The next step, represented in FIG. 11, consists in depositing and then advantageously etching reflector/getter assembly 22 by means of any known method in the form of thin layers covering cavity 23 and a part of superficial passivation layer 14 to constitute bearing points 25. For example purposes, this step consists in successively depositing and etching a thin layer of TiN forming second barrier layer 27 of first getter 20, a thin layer of Ti forming first getter 20, a thin layer of SiN forming first barrier layer 26, and then a thin layer of aluminum (Al) forming reflector 17.

Figure 12:
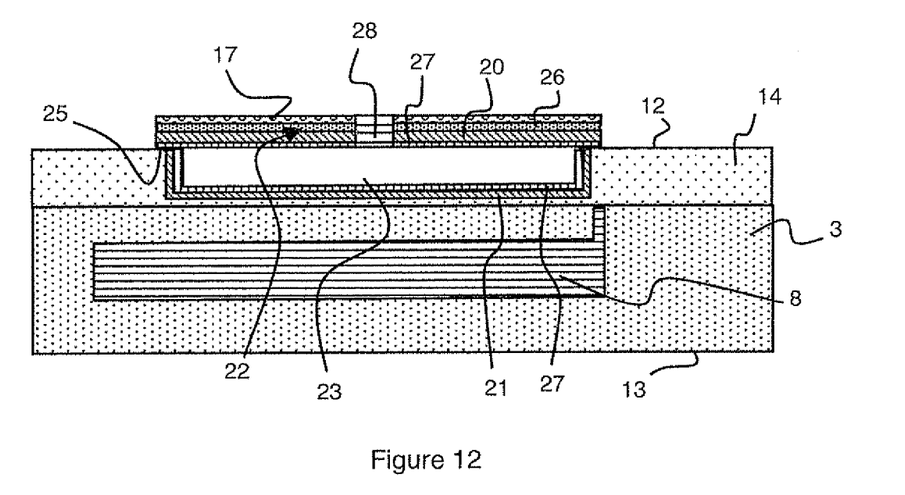

Hole 28 is then formed by etching reflector/getter assembly 22 (FIG. 12). During the fabrication method, hole 28 made in reflector/getter assembly 22 enables the material of sacrificial layer 31 to be eliminated by etching. Preferably the whole of the sacrificial material is eliminated from cavity 23. Second barrier layer 27 of reflector/getter assembly 22 then constitutes accessible surface 24 of getter 20 released by cavity 23.

In the case of the alternative embodiment represented in FIG. 7, it is not necessary to make a hole 28. Reflector/getter assembly 22 is in fact formed by a stack of thin layers that only partially covers sacrificial layer 31. The non-covered parts of sacrificial layer 31 form lateral openings 30 after sacrificial layer 31 has been eliminated. Lateral openings 30 can for example be arranged on each side of reflector/getter assembly 22.

The uncooled thermal detector and/or emitter 1 is then made and then encapsulated by means of any known method to obtain the device represented in FIG. 4.

For example purposes, uncooled thermal detector and/or emitter 1 is made on a sacrificial layer, for example made from polyimide, with a thickness comprised between 1 μm and 2.5 μm, preferably corresponding to a quarter of the wavelength to be detected and/or to be emitted so as to constitute a quarter-wave distance between electrodes 15 and reflector 17 resulting in maximum absorption.

For indicative purposes, encapsulation can be performed, preferably by means of a well known micro-encapsulation technique in a vacuum or under reduced pressure. This technique consists in depositing a sacrificial layer covering uncooled thermal detector and/emitter 1, followed by a thin layer forming cap 9. Finally the sacrificial layer is etched by means of a vent 32 (FIG. 4) made in cap 9 to define housing 10 and release detector and/or emitter 1. Housing 10 is then sealed and made hermetic by deposition of a sealing layer 11 in a vacuum or under reduced pressure. Practically, sealing is performed in a vacuum chamber (FIG. 4).

Before sealing, getter or getters 20 and 21 are advantageously activated by heat treatment. The in-situ activation temperature has to be high enough to cause desorption of the chemical species present in the getter material. Activation is preferably performed by annealing in a vacuum at a temperature comprised between 350° C. and 450° C. during a period varying between about 10 to 60 minutes.

Likewise, before sealing is performed, second barrier layer or layers 27 are made permeable to the residual gases to be absorbed by a heat treatment step at a temperature of more than 150° C.

Figure 13:
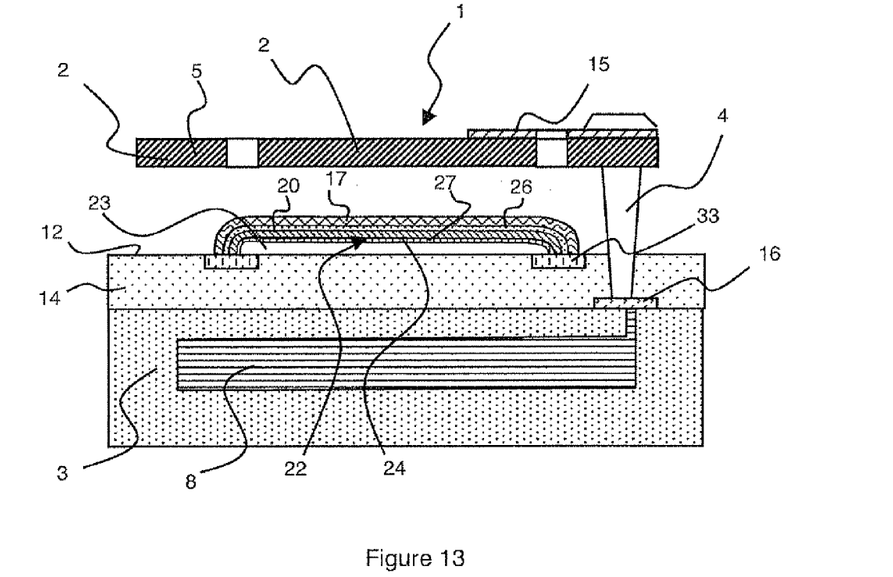
FIG. 13 schematically represents a cross-section of a second particular embodiment of a device for detection and/or emission of electromagnetic radiation according to the invention.

According to a second particular embodiment, reflector/getter assembly 22 forms a suspended structure above substrate 3. As represented in FIG. 13, free space 23 releasing accessible surface 24 of the getter of reflector/getter assembly 22 is formed by a local raising of reflector/getter assembly 22. According to a representation in cross-section, the latter appears in the form of a bridge resting on at least two anchoring areas 33.

Advantageously, raising of reflector/getter assembly 22 enables assembly 22 to be separated from superficial passivation layer 14 by a distance preferably comprised between 50 nm and 200 nm. Assembly 22 is then moved closer to membrane 2. The distance between reflector/getter assembly 22 and membrane 2 is reduced to a distance comprised between 2 μm and 5 μm.

The residual gases to be absorbed can thus reach accessible surface 24 of the getter or getters via at least one lateral passage created by the localized raising between anchoring areas 33.

Anchoring area 33 is designed to perform securing of reflector/getter assembly 22 to front surface 12 of substrate 3 and to maintain the latter at a certain distance from membrane 2.

A fabrication method of the device for detection and/or emission of electromagnetic radiation according to the second embodiment (FIG. 13) comprises formation of free space 23 between reflector/getter assembly 22 and front surface 12 of substrate 3 by means of the successive steps described in the following.

Figure 14:
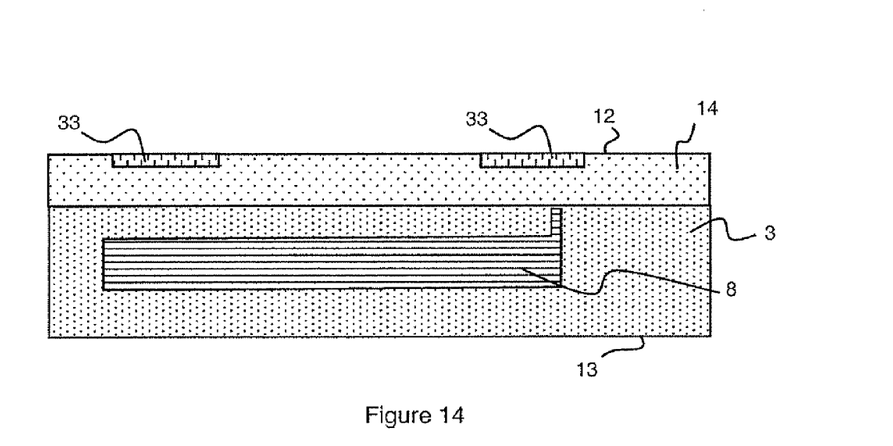
FIGS. 14 to 16 schematically represent cross-sections of different steps of a fabrication method of the invention according to FIG. 13.

As represented in FIG. 14, at least two anchoring areas 33 of reflector/getter assembly 22 are formed on front surface 12 of substrate 3. Anchoring area 33 can be formed by modifying a localized area of front surface 12 of substrate 3. For purely indicative example purposes only, local abrasion can be envisaged by plasma etching or ionic machining of superficial passivation layer 14.

According to a non-represented alternative embodiment, anchoring area 33 can be achieved by geometric modification of this area. A design, in particular grooves or bosses, can be defined by deposition and etching using any known method and perform securing of reflector/getter assembly 22.

Alternately or in complementary manner, it can also be envisaged to modify the nature or the composition of the material forming this localized area, for example by ion implantation, oxidation or reduction.

Figure 15:
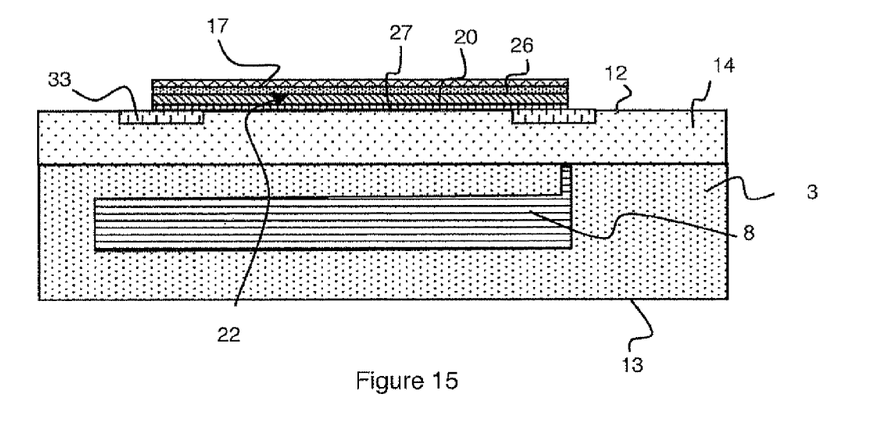

Reflector/getter assembly 22 is then deposited on front surface 12 of substrate 3 in the form of thin layers covering at least a part of each anchoring area 33 (FIG. 15).

The detector and/or emitter fabrication and encapsulation steps of the fabrication method are similar to those of the first fabrication method described above.

Figure 16:
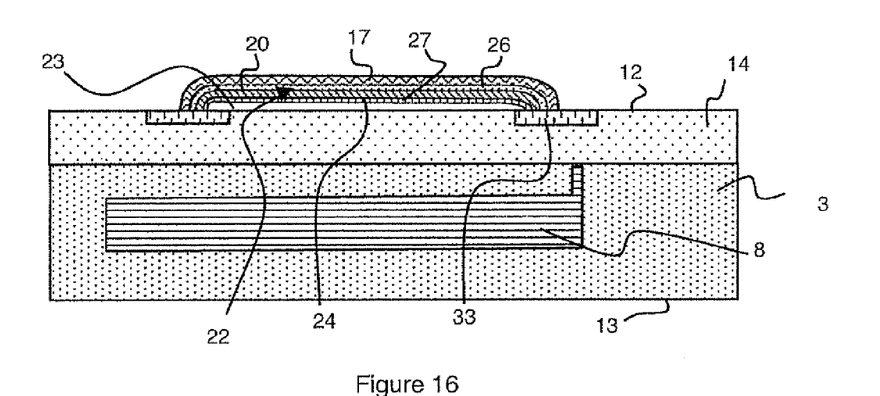

As represented in FIG. 16, at least a part of reflector/getter assembly 22 arranged between anchoring areas 33 is lifted-off and raised locally by heat treatment at high temperature. Active surface 24 of getter 20 is released before sealing so as to protect the getter throughout the fabrication method.

This heat treatment is advantageously performed by means of a short anneal at high temperature, preferably at a temperature of more than 300° C. for a time t comprised between 1 to 100 seconds. This heat treatment generates thermal stresses that produce lift-off of reflector/getter assembly 22. The difference of the coefficients of expansion between the constituents of reflector/getter assembly 22, essentially made from metal, and that of front surface 12 of substrate 3, gives rise to mechanical stresses responsible for lift-off and raising. This heat treatment must not be prolonged to prevent any damage to the components of the device for detection and/or emission of electromagnetic radiation that are sensitive to high temperatures.

Lift-off forms free space 23 releasing accessible surface 24 of getter 20.

Figure 17:
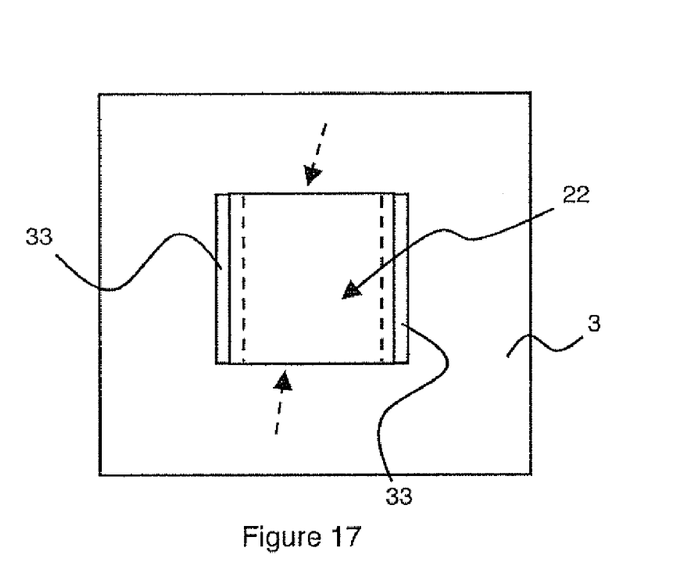
FIG. 17 schematically represents a top view of FIG. 16.

As represented in FIG. 17, lift-off also forms at least one lateral passage. Free space 23 then communicates with housing 10 via at least one lateral passage (dashed arrows in FIG. 17).

Figure 18:
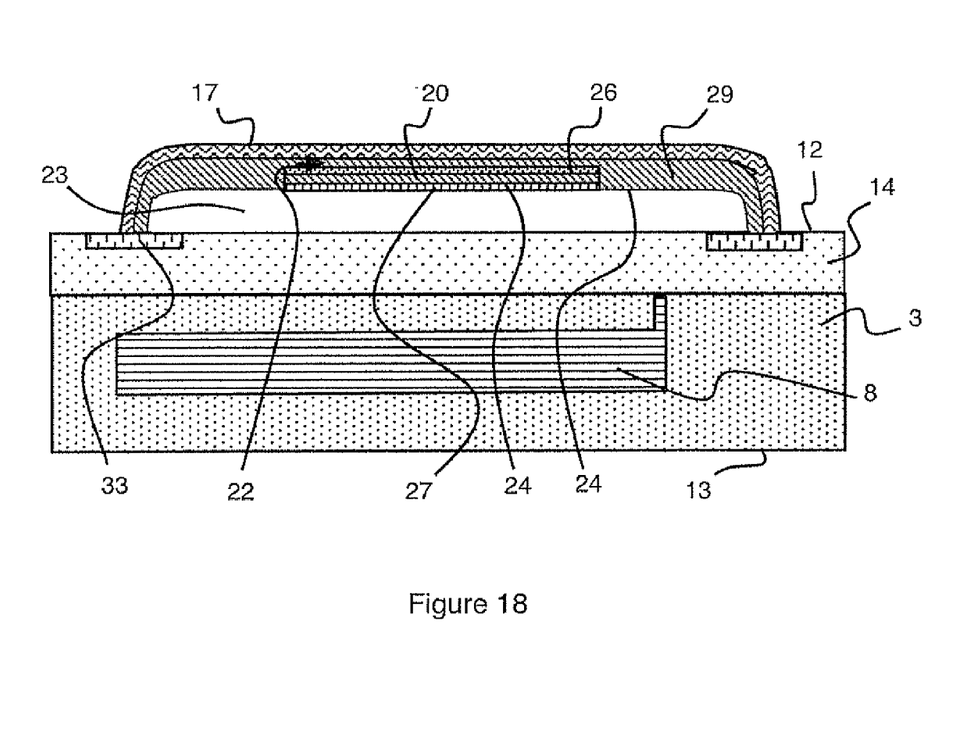
FIG. 18 schematically represents a cross-section of a third particular embodiment of a device for detection and/or emission of electromagnetic radiation according to the invention.

According to a third embodiment represented in FIG. 18, reflector/getter assembly 22 is formed by two first getters 20 and 29 and reflector 17. Getters 20 and 29 are arranged in such a way that each of them has an accessible surface 24 released by free space 23. This embodiment enables the efficiency of pumping to be optimized by combining the specificities of the different getter materials. Getter 20 can for example be made from a material selectively absorbing hydrogen and getter 29 from a material selectively absorbing oxygen.

The method for fabricating such a device comprises a deposition step of reflector/getter assembly 22 according to the successive steps described in the following.

Figure 19:
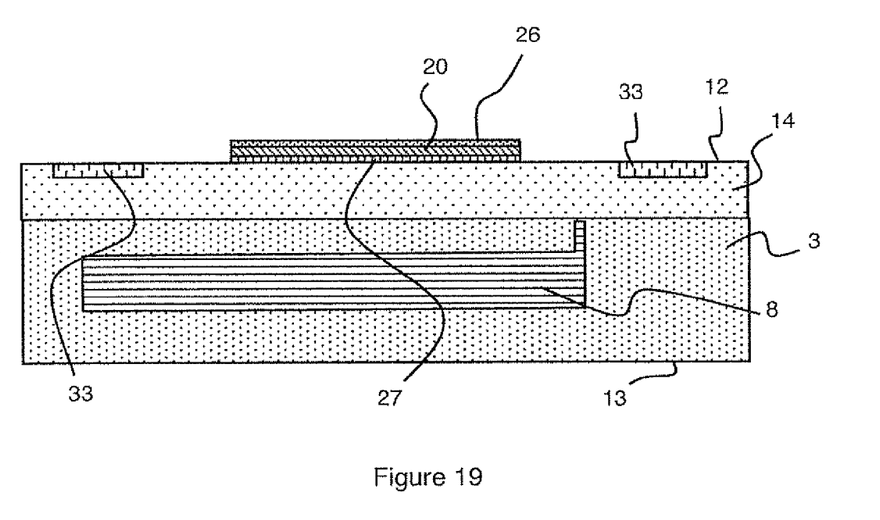
FIGS. 19 and 20 schematically represent cross-sections of different steps of a fabrication method of the invention according to FIG. 18.

As represented in FIG. 19, getter 20 is deposited and etched if required on front surface 12 of substrate 3, between anchoring areas 33 and at a distance from these anchoring areas 33.

A first barrier layer 26 and a second barrier layer 27 are advantageously deposited and etched if required so as to be situated respectively on and underneath getter 20.

Figure 20:
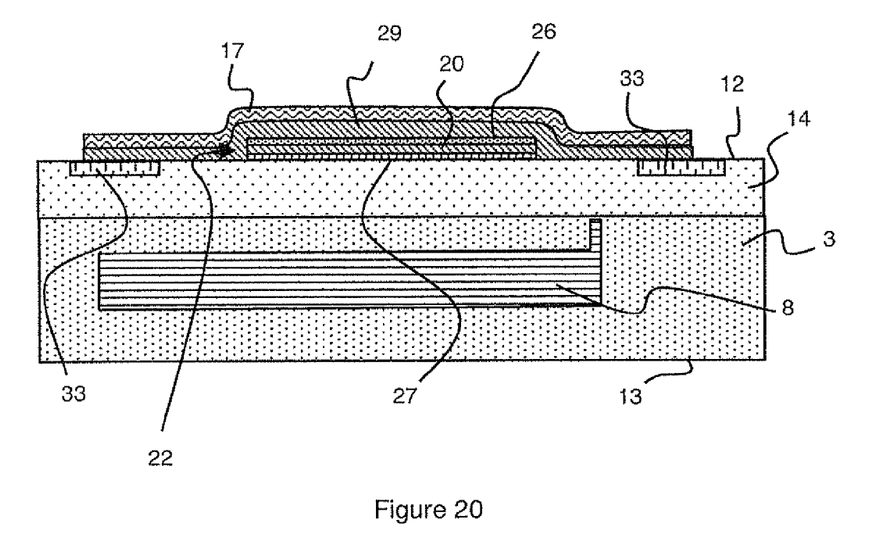

As represented in FIG. 20, getter 29 is then deposited so as to cover getter 20, at least a part of each anchoring area 33 and front surface 12 of substrate 3 situated between getter 20 and anchoring areas 33. The bottom surface of getter 20 and a part of the bottom surface of getter 29 are in the extension of one another, in contact with front surface 12 of substrate 3. Then reflector 17 is finally deposited to cover at least getter 29.

According to a non-represented alternative embodiment, reflector 17 covers not only getter 29 but also extends over a part of superficial passivation layer 14.

The design of each layer constituting reflector/getter assembly 22 is defined if required by etching by means of any known method either after each deposition or once all the thin layers forming reflector/getter assembly 22 have been deposited.

The subsequent steps of the fabrication method are identical to those of the first fabrication mode described in the above.

After reflector/getter assembly 22 has been lifted-off (FIG. 18), the accessible surfaces of getter 20 and 29 are released. As illustrated in FIG. 18, getter 20 is in practice inserted in getter 29.

The invention is not limited to the embodiments described above that have been given for non-restrictive example purposes only. For example the substrate can be devoid of superficial passivation layer 14. Free space 23 is then achieved by means of identical fabrication methods to those described in the foregoing, directly in or on the silicon wafer comprising the read circuit and/or stimuli means.

The methods for fabricating the device for detection and/or emission of electromagnetic radiation according to the second and third embodiments advantageously enable getter or getters 20, 21 or 29 to be protected throughout the fabrication method thereby reducing the risks of contamination of getters 20, 21 and 29. Indeed, releasing of accessible surface 24 of the getter or getters is preferably performed last, just before sealing of the device for detection and/or emission of electromagnetic radiation in a vacuum or under reduced pressure. Getter or getters 20, 21 or 29 are consequently protected from any contamination throughout the fabrication method of the device. Advantageously, activation of getter or getters 20, 21 or 29 before sealing is no longer indispensable.

The device for detection and/or emission of electromagnetic radiation according to the invention enables locations to be set aside for getters 20, 21 and 29 without however lowering the optic filling factor of thermal detectors and/or emitters 1 and while at the same time maintaining optimal performances of the device. The structure of thermal detector and/or emitter device 1 in particular enables a reflector and a getter to be integrated while avoiding any drop-off of the reflection coefficient of reflector 17 with time.

The invention claimed is:
1. Device for detection and/or emission of electromagnetic radiation having an encapsulation micropackage in a vacuum or under reduced pressure that comprises a cap and a substrate delineating a tightly sealed housing, said housing encapsulating:
- at least one uncooled thermal detector and/or emitter having a membrane sensitive to electromagnetic radiation suspended above the substrate,
- a reflector for reflecting the electromagnetic radiation to the membrane, in the form of a thin layer arranged between a front surface of the substrate and the membrane, said reflector having a first main surface facing the membrane and a second main surface facing the front surface of the substrate and,
- at least one getter, device wherein the getter is arranged on at least a part of the second main surface of the reflector to form a reflector/getter assembly and a free space, releasing an accessible surface of the getter and in communication with the housing, is formed between the reflector/getter assembly and the front surface of the substrate.

2. Device according to claim 1, wherein the reflector/getter assembly bears on the front surface of the substrate via at least one bearing point.

3. Device according to claim 1, wherein the reflector/getter assembly forms a suspended structure above the substrate.

4. Device according to claim 1, wherein the front surface of the substrate is formed by a superficial passivation layer in which the free space is made.

5. Device according to claim 1, comprising at least one hole passing through the reflector/getter assembly.

6. Device according to claim 1, wherein the reflector/getter assembly comprises a first barrier layer between the reflector and the getter.

7. Device according to claim 1, wherein the getter is made from a metal chosen from titanium, molybdenum, barium, tantalum, zirconium, iron and vanadium or an alloy based on these metals.

8. Device according to claim 1, wherein the reflector is metallic made from a metal chosen from aluminum, gold and copper or an alloy based on these metals.

9. Method for fabricating a device for detection and/or emission of electromagnetic radiation according to claim 1, comprising formation of said free space between the reflector/getter assembly and the front surface of the substrate.

10. Method according to claim 9, comprising the following successive steps:
- etching of a superficial passivation layer constituting the front surface of the substrate to form a cavity in said layer,
- filling of the cavity with a sacrificial material followed by planarization with respect to the surface of the superficial passivation layer,
- deposition of the reflector/getter assembly in the form of thin layers covering said cavity and a part of the superficial passivation layer to constitute bearing points,
- elimination of the sacrificial material.

11. Method according to claim 9, comprising the following successive steps:
- formation of at least two anchoring areas of the reflector/getter assembly on the front surface of the substrate,
- deposition of the reflector/getter assembly on the front surface of the substrate in the form of thin layers covering at least a part of each anchoring area,
- heat treatment at high temperature to locally lift-off and raise at least a part of the reflector/getter assembly located between the anchoring areas, said heat treatment being performed at a temperature of more than 300° C. for a time t comprised between 1 and 100 seconds, said lift-off forming the free space releasing an accessible surface of the getter and said free space communicating with the housing via at least one lateral passage.

12. Method according to claim 11, wherein the reflector/getter assembly is formed by at least a first getter, a second getter and the reflector, and deposition of said assembly comprises the following successive steps:
- deposition of the first getter on the front surface of the substrate, between the anchoring areas and at a distance from said anchoring areas,
- deposition of the second getter covering the first getter, at least a part of each anchoring area and the front surface of the substrate situated between the first getter and the anchoring areas and,
- deposition of the reflector covering at least the second getter.

13. Method according to claim 9, wherein the reflector/getter assembly comprises a second barrier layer that covers the accessible surface of the getter released by the free space and the second barrier layer is made permeable to the residual gases to be absorbed by a heat treatment step at a temperature of more than 150° C.

14. Method according to claim 9, wherein the reflector/getter assembly bears on the front surface of the substrate via at least one bearing point.

15. Method according to claim 9, wherein the reflector/getter assembly forms a suspended structure above the substrate.

16. Method according to claim 9, wherein the front surface of the substrate is formed by a superficial passivation layer in which the free space is made.

17. Method according to claim 9, wherein the reflector/getter assembly comprises a first barrier layer between the reflector and the getter.

18. Method according to claim 9, wherein the getter is made from a metal chosen from titanium, molybdenum, barium, tantalum, zirconium, iron and vanadium or an alloy based on these metals.

19. Method according to claim 9, wherein the reflector is metallic made from a metal chosen from aluminum, gold and copper or an alloy based on these metals.

* * * * *